(12) United States Patent
Sugime (10) Patent No.: US 11,323,186 B2
(45) Date of Patent: May 3, 2022

(54) POWER OVER FIBER SYSTEM AND OPTICAL FIBER CABLE

(71) Applicant: KYOCERA CORPORATION, Kyoto (JP)

(72) Inventor: Tomonori Sugime, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/442,116

(22) PCT Filed: Jul. 9, 2020

(86) PCT No.: PCT/JP2020/026807
§ 371 (c)(1),
(2) Date: Sep. 22, 2021

(87) PCT Pub. No.: WO2021/024689
PCT Pub. Date: Feb. 11, 2021

(65) Prior Publication Data
US 2022/0094446 A1  Mar. 24, 2022

(30) Foreign Application Priority Data
Aug. 5, 2019 (JP) .............................. JP2019-143468

(51) Int. Cl.
*H04B 10/80* (2013.01)
*G02B 6/028* (2006.01)

(52) U.S. Cl.
CPC ......... *H04B 10/807* (2013.01); *G02B 6/0285* (2013.01)

(58) Field of Classification Search
None
See application file for complete search history.

(56) References Cited

U.S. PATENT DOCUMENTS

| 4,660,928 A | 4/1987 | Jaeger et al. |
| 8,358,893 B1 * | 1/2013 | Sanderson ........... G02B 6/4415 385/115 |
| 2001/0021298 A1 * | 9/2001 | Mukasa ............... G02B 6/0285 385/124 |

(Continued)

FOREIGN PATENT DOCUMENTS

| EP | 1341011 A1 | 9/2003 |
| JP | S62116902 A | 5/1987 |

(Continued)

*Primary Examiner* — David W Lambert
(74) *Attorney, Agent, or Firm* — Hauptman Ham, LLP (57) ABSTRACT

A power over fiber system includes an optical fiber cable. The optical fiber cable includes a core, a first cladding and a second cladding. The core transmits signal light. The first cladding is positioned in contact with periphery of the core and transmits feed light. The second cladding is positioned in contact with periphery of the first cladding. Radial refractive index distribution of the first cladding is distribution in which refractive index gradually decreases from a local maximum at an internal point toward points where the first cladding is in contact with the core and the second cladding, respectively. The internal point is away from the core and the second cladding. The refractive index of the core is higher than the refractive index of the first cladding at the point where the first cladding is in contact with the core.

6 Claims, 5 Drawing Sheets (56) References Cited

U.S. PATENT DOCUMENTS

| | | | | |
|---|---|---|---|---|
| 2002/0102085 A1* | 8/2002 | Arai | ................... | G02B 6/03644 |
| | | | | 385/127 |
| 2005/0226625 A1* | 10/2005 | Wake | ............... | H04B 10/25753 |
| | | | | 398/115 |
| 2011/0181436 A1* | 7/2011 | Davey | ................... | E21B 47/135 |
| | | | | 340/854.7 |
| 2018/0083715 A1* | 3/2018 | Greene | ................ | H04B 10/807 |
| 2018/0375590 A1* | 12/2018 | Skertic | ................. | H04B 10/808 |

FOREIGN PATENT DOCUMENTS

| | | | |
|---|---|---|---|
| JP | 2000356719 | A | 12/2000 |
| JP | 2001311849 | A | 11/2001 |
| JP | 2010135989 | A | 6/2010 |
| JP | 201413311 | A | 1/2014 |
| JP | 201442166 | A | 3/2014 |
| WO | 0114917 | A1 | 3/2001 |

* cited by examiner

POWER OVER FIBER SYSTEM AND OPTICAL FIBER CABLE

RELATED APPLICATIONS

The present application is a National Phase of International Application Number PCT/JP2020/026807 filed Jul. 9, 2020 and claims priority to Japanese Application Number 2019-143468 filed Aug. 5, 2019.

TECHNICAL FIELD

The present disclosure relates to optical power supply.

Recently, there has been studied an optical power supply system that converts electric power into light (called feed light), transmits the feed light, converts the feed light into electric energy, and uses the electric energy as electric power.

There is disclosed in Patent Literature 1 an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

CITATION LIST

Patent Literature

Patent Literature 1: JP 2010-135989 A

SUMMARY OF INVENTION

Problem to Solve

In optical power supply, further improvement of optical power supply efficiency is required.

Like the above conventional technique, in the case where a core transmits signal light and a first cladding transmits feed light, reduction of transmission loss in the first cladding is required in order to improve transmission efficiency of the feed light.

Solution to Problem

A power over fiber system according to an aspect of the present disclosure is a power over fiber system including:

a first data communication device including a power sourcing equipment including a semiconductor laser that oscillates with electric power, thereby outputting feed light;

a second data communication device including a powered device including a photoelectric conversion element that converts the feed light output by the power sourcing equipment into electric power, the second data communication device performing optical communication with the first data communication device; and an optical fiber cable having one end connectable to the first data communication device and another end connectable to the second data communication device to transmit the feed light and signal light, wherein the electric power obtained by the conversion by the photoelectric conversion element is driving power for the second data communication device, wherein the optical fiber cable includes: a core that transmits the signal light; a first cladding that is positioned in contact with periphery of the core and transmits the feed light; and a second cladding that is positioned in contact with periphery of the first cladding, wherein radial refractive index distribution of the first cladding is distribution in which refractive index gradually decreases from a local maximum at an internal point toward points where the first cladding is in contact with the core and the second cladding, respectively, the internal point being away from the core and the second cladding, and wherein the refractive index of the core is higher than the refractive index of the first cladding at the point where the first cladding is in contact with the core.

DESCRIPTION OF EMBODIMENTS

Hereinafter, embodiments of the present disclosure will be described with reference to the drawings.

(1) Outline of System

First Embodiment

Figure 1:
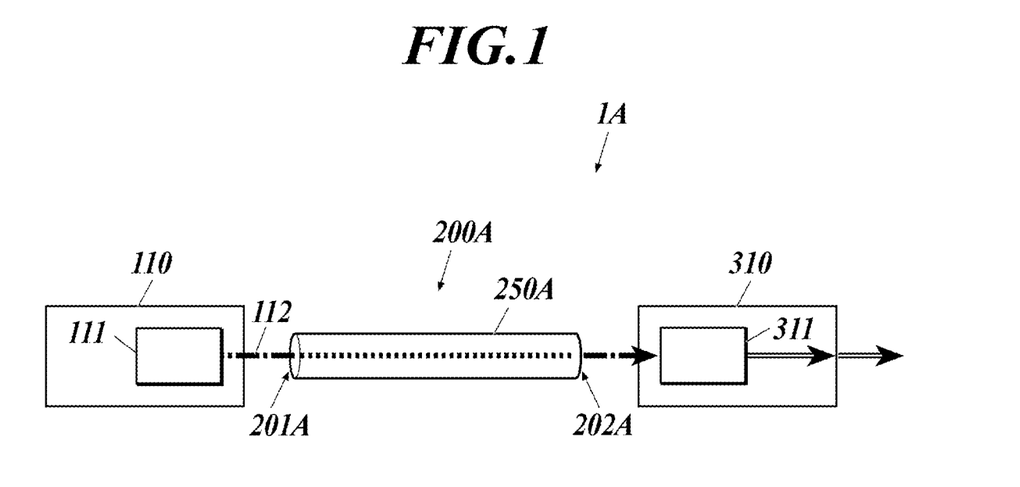
FIG. 1 is a block diagram of a power over fiber system according to a first embodiment of the present disclosure.

As shown in FIG. 1, a power over fiber (PoF) system 1A of this embodiment includes a power sourcing equipment (PSE) 110, an optical fiber cable 200A and a powered device (PD) 310.

In the present disclosure, a power sourcing equipment converts electric power into optical energy and supplies (sources) the optical energy, and a powered device receives (draws) the supplied optical energy and converts the optical energy into electric power.

The power sourcing equipment 110 includes a semiconductor laser 111 for power supply.

The optical fiber cable 200A includes an optical fiber 250A that forms a transmission path of feed light.

The powered device 310 includes a photoelectric conversion element 311.

The power sourcing equipment 110 is connected to a power source, and electrically drives the semiconductor laser 111 and so forth.

The semiconductor laser 111 oscillates with the electric power from the power source, thereby outputting feed light 112.

The optical fiber cable 200A has one end 201A connectable to the power sourcing equipment 110 and the other end 202A connectable to the powered device 310 to transmit the feed light 112.

The feed light 112 from the power sourcing equipment 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

Second Embodiment

Figure 2:
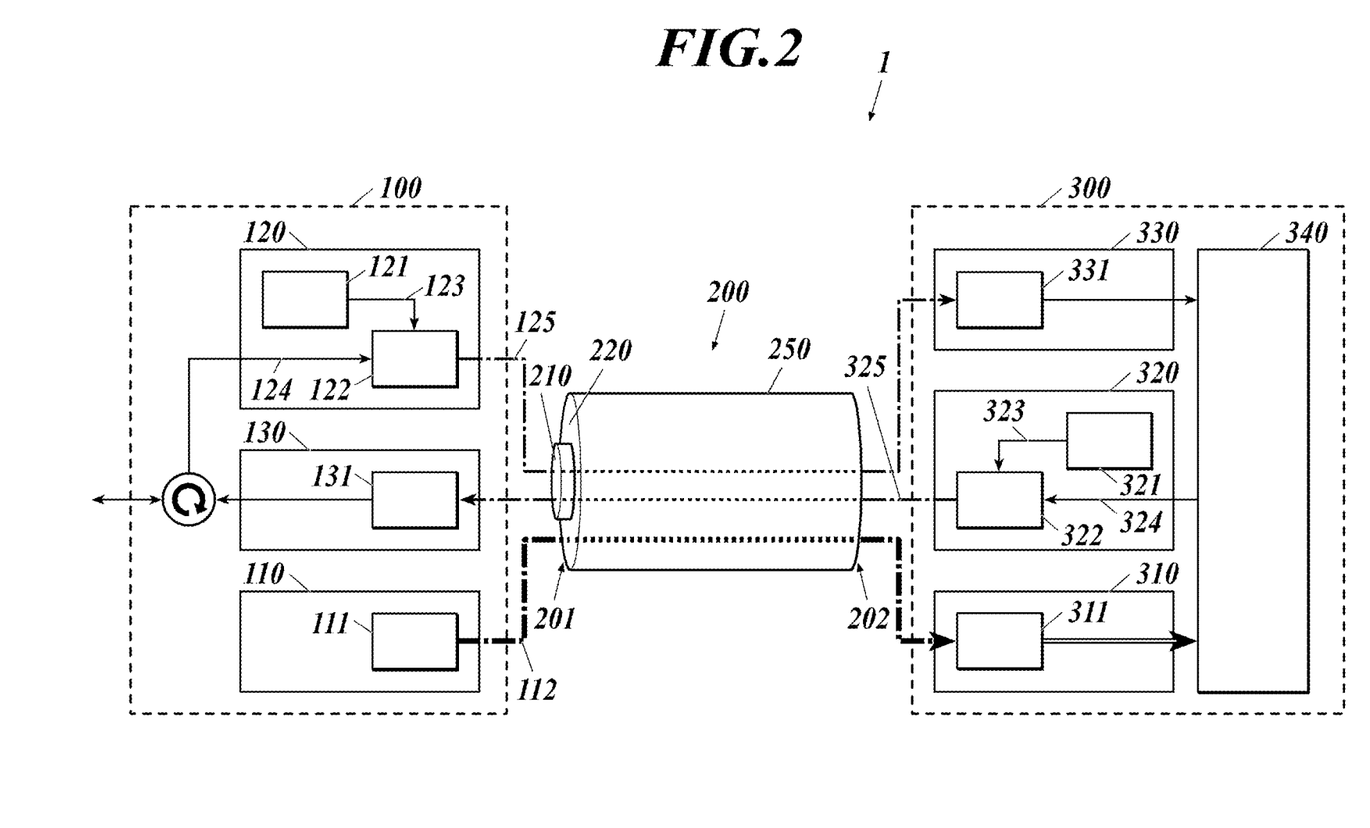
FIG. 2 is a block diagram of a power over fiber system according to a second embodiment of the present disclosure.

As shown in FIG. 2, a power over fiber (PoF) system 1 of this embodiment includes a power supply system through an optical fiber and an optical communication system therethrough, and includes: a first data communication device 100 including a power sourcing equipment (PSE) 110; an optical fiber cable 200; and a second data communication device 300 including a powered device (PD) 310.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
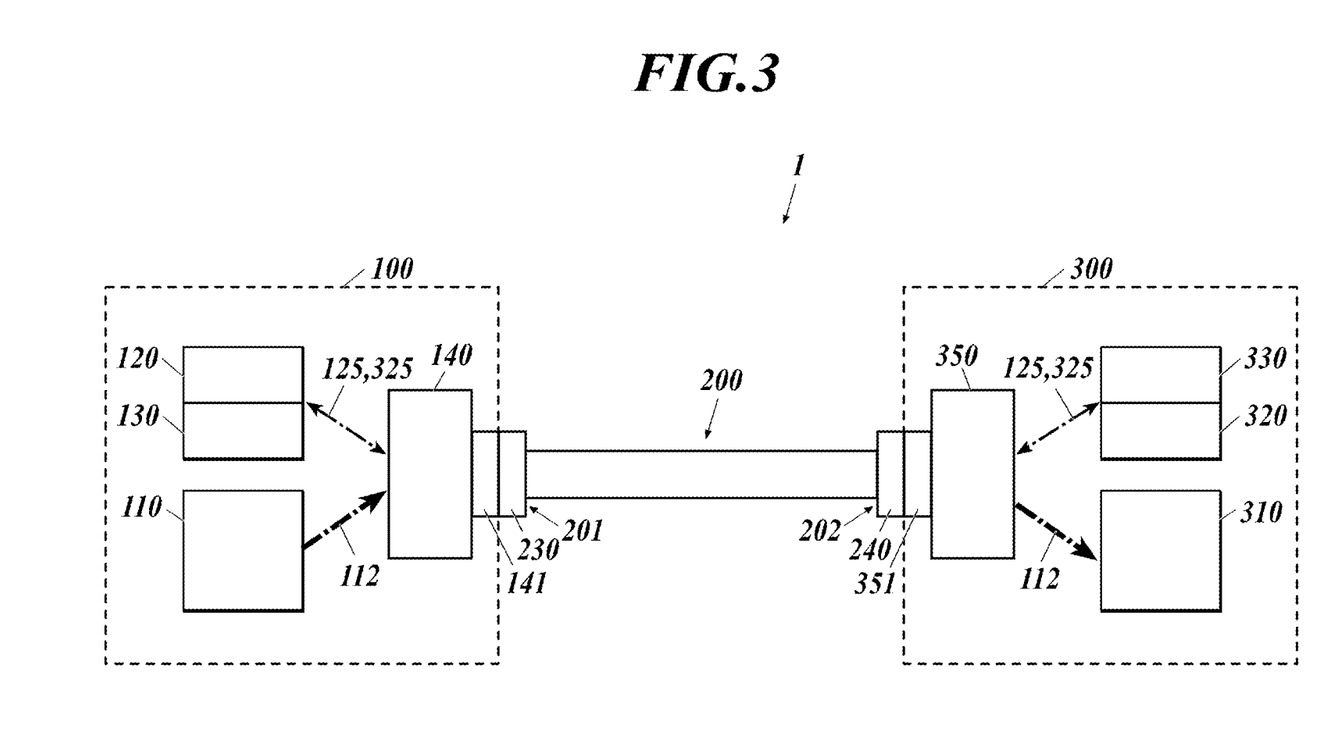
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125, 325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
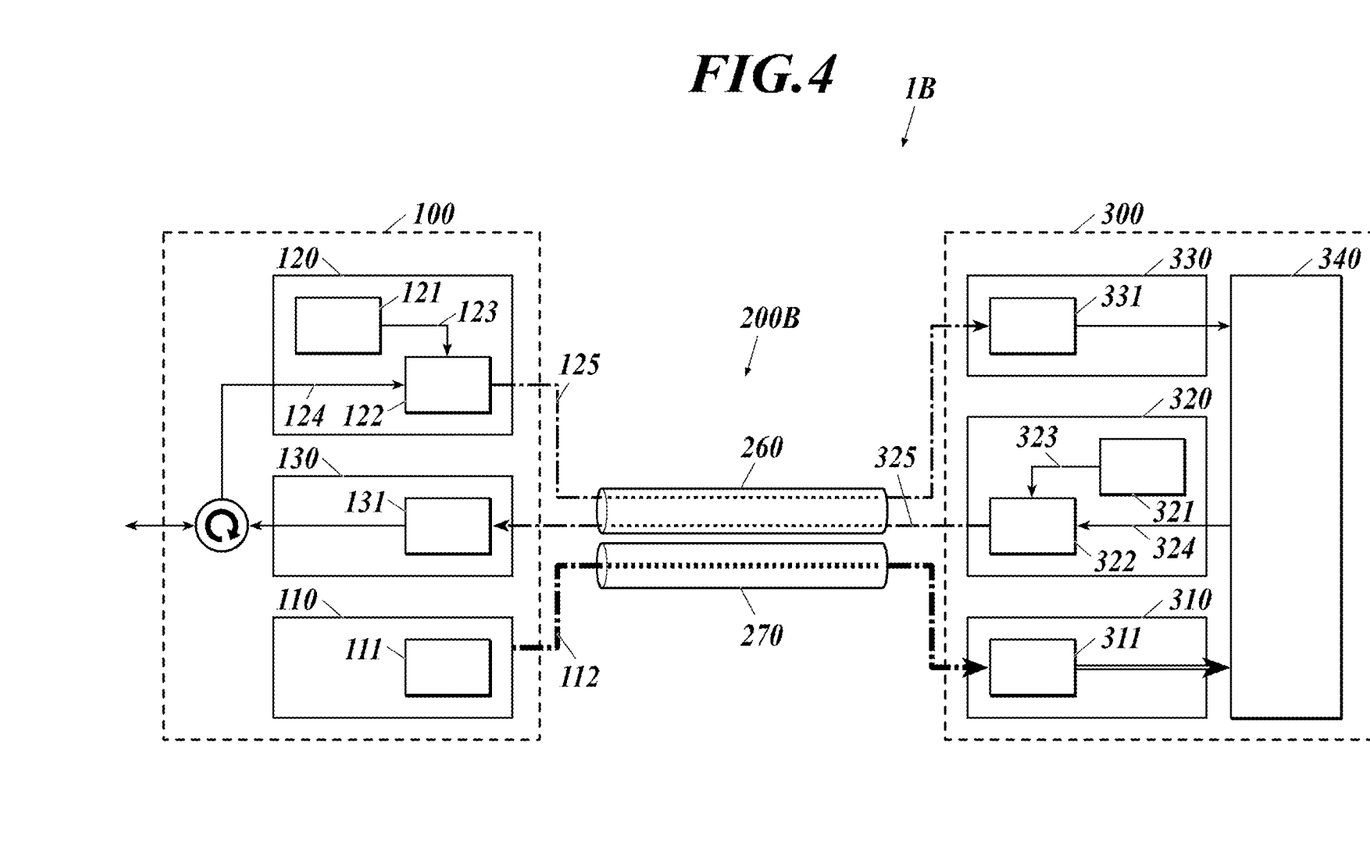
FIG. 4 is a block diagram of a power over fiber system according to another embodiment of the present disclosure.

Like an optical fiber cable 200B of a power over fiber system 1B shown in FIG. 4, an optical fiber 260 that transmits signal light and an optical fiber 270 that transmits feed light may be provided separately. Further, the optical fiber cable 200B may be composed of a plurality of optical fiber cables.

(2) Embodiment of Optical Fiber Cable Having Graded-Index First Cladding

Next, an embodiment of an optical fiber cable having a graded-index first cladding will be described with reference to FIG. 5A to FIG. 5D in addition to FIG. 2 and FIG. 3.

In the power over fiber system 1 (configured as shown in FIG. 2 and FIG. 3) described as the second embodiment, the optical fiber 250 included in the optical fiber cable 200 is configured as follows.

Figure 5A:
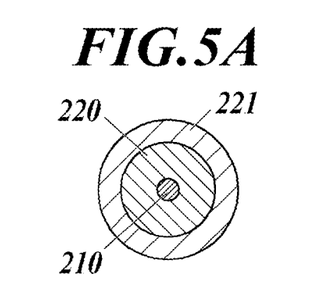
FIG. 5A is a sectional view of an optical fiber perpendicular to its axis.
Figure 5B:
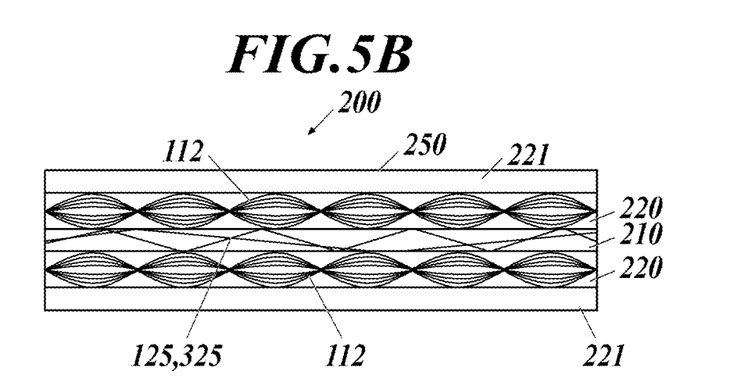
FIG. 5B is a sectional view of the optical fiber including the axis.
Figure 5C:
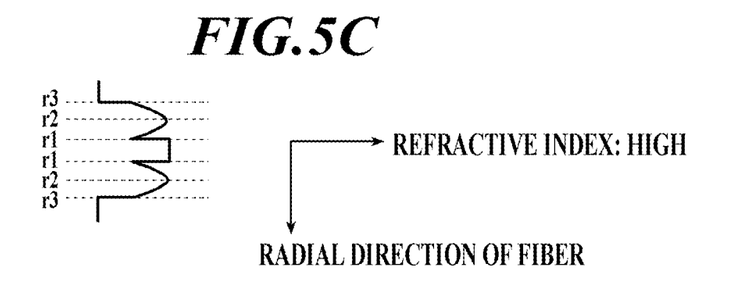
FIG. 5C shows an example of radial refractive index distribution of the optical fiber.
Figure 5D:
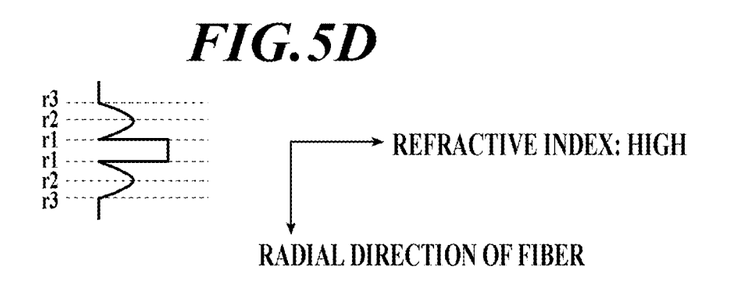
FIG. 5D shows another example of the radial refractive index distribution of the optical fiber.

FIG. 5A is a sectional view of the optical fiber 250 perpendicular to its axis. FIG. 5B is a sectional view of the optical fiber 250 including the axis. FIG. 5C shows an example of radial refractive index distribution of the optical fiber 250. FIG. 5D shows another example of the radial refractive index distribution of the optical fiber 250.

The optical fiber 250 includes the core 210 that transmits the signal light 125, 325, the first cladding 220 that is positioned in contact with the periphery of the core 210 and transmits the feed light 112, and the second cladding 221 that is positioned in contact with the periphery of the first cladding.

As shown in FIG. 5A to FIG. 5D, the core 210 is a multi-mode light transmission path similar to a core of a step-index multi-mode fiber and has a certain refractive index.

The radial refractive index distribution of the first cladding 220 is distribution in which the refractive index gradually decreases from a local maximum at an internal point r2 toward points r1, r3 where the first cladding 220 is in contact with the core 210 and the second cladding 221, respectively, the internal point r2 being away from the core 210 and the second cladding 221.

The refractive index of the core 210 is higher than the refractive index of the first cladding 220 at the point r1 where the first cladding 220 is in contact with the core 210. This confines the signal light in the core 210 with a high efficiency.

As shown in FIG. 5C, the distribution may be distribution in which the refractive index of the second cladding 221 is lower than the refractive index of the first cladding 220 at the point r3 where the first cladding 220 is in contact with the second cladding 221. This can ensure drops of the refractive index at the inner-circumference-side point (r1) and the outer-circumference-side point (r3) of the first cladding 220 and confines the feed light in the first cladding 220 with a high efficiency.

According to this embodiment, the first cladding 220 that transmits feed light is a graded-index multi-mode light transmission path. This can reduce the transmission loss of the feed light in the first cladding 220 and improve the transmission efficiency of the feed light 112, and consequently improve the optical power supply efficiency.

Although some embodiments of the present disclosure have been described above, these embodiments are made for purposes of illustration and example only. The present invention can be carried out in various other forms, and each component may be omitted, replaced or modified/changed within a range not departing from the scope of the present invention.

Regardless of the embodiments, the core 210 may also be of a graded-index type.

The magnitude relationship between the local maximum of the refractive index of the first cladding 220 (at the point r2 in the radial direction) and the refractive index (local maximum) of the core 210 may be determined arbitrarily. The former may be equal to, higher than or lower than the latter.

Further, the above is also applicable to a quadruple-layered optical fiber composed of a core, a first cladding, a second cladding and a third cladding.

That is, a core may be a step-index multi-mode fiber, and a cladding that transmits feed light may be a graded-index multi-mode fiber.

INDUSTRIAL APPLICABILITY

The present invention is applicable to a power over fiber system and an optical fiber cable.

REFERENCE SIGNS LIST

1A Power over Fiber System (Optical Power Supply System)
1 Power over Fiber System (Optical Power Supply System)
1B Power over Fiber System (Optical Power Supply System)
100 First Data Communication Device 110 Power Sourcing Equipment
111 Semiconductor Laser for Power Supply
112 Feed Light
120 Transmitter
125 Signal Light
130 Receiver
140 Light Input/Output Part
141 Optical Connector
200A Optical Fiber Cable
200 Optical Fiber Cable
200B Optical Fiber Cable
210 Core
220 Cladding (First Cladding)
221 Second Cladding
250A Optical Fiber
250 Optical Fiber
260 Optical Fiber
270 Optical Fiber
300 Second Data Communication Device
310 Powered Device
311 Photoelectric Conversion Element
320 Transmitter
325 Signal Light
330 Receiver
350 Light Input/Output Part
351 Optical Connector
401 Visible Light
410 Lid
411 Wavelength Conversion Material
420 Lid
421 Wavelength Conversion Material
600 Optical Transmission Power Source Cable

The invention claimed is:

1. A power over fiber system comprising:
a first data communication device including a power sourcing equipment including a semiconductor laser that oscillates with electric power, thereby outputting feed light;
a second data communication device including a powered device including a photoelectric conversion element that converts the feed light output by the power sourcing equipment into electric power, the second data communication device performing optical communication with the first data communication device; and
an optical fiber cable having one end connectable to the first data communication device and another end connectable to the second data communication device to transmit the feed light and signal light,
wherein the electric power obtained by the conversion by the photoelectric conversion element is driving power for the second data communication device,
wherein the optical fiber cable includes: a core that transmits the signal light; a first cladding that is positioned in contact with periphery of the core and transmits the feed light; and a second cladding that is positioned in contact with periphery of the first cladding,
wherein radial refractive index distribution of the first cladding is distribution in which refractive index gradually decreases from a local maximum at an internal point toward points where the first cladding is in contact with the core and the second cladding, respectively, the internal point being away from the core and the second cladding, and
wherein the refractive index of the core is higher than the refractive index of the first cladding at the point where the first cladding is in contact with the core.

2. The power over fiber system according to claim 1, wherein the refractive index of the second cladding is lower than the refractive index of the first cladding at the point where the first cladding is in contact with the second cladding.

3. The power over fiber system according to claim 1, wherein a semiconductor material of a semiconductor region of the semiconductor laser, the semiconductor region exhibiting a light-electricity conversion effect, is a laser medium having a laser wavelength of 500 nm or less.

4. An optical fiber cable for optical communication and optical power supply, comprising:
a core that transmits signal light;
a first cladding that is positioned in contact with periphery of the core and transmits feed light; and
a second cladding that is positioned in contact with periphery of the first cladding,
wherein radial refractive index distribution of the first cladding is distribution in which refractive index gradually decreases from a local maximum at an internal point toward points where the first cladding is in contact with the core and the second cladding, respectively, the internal point being away from the core and the second cladding, and
wherein the refractive index of the core is higher than the refractive index of the first cladding at the point where the first cladding is in contact with the core.

5. The optical fiber cable according to claim 4, wherein the refractive index of the second cladding is lower than the refractive index of the first cladding at the point where the first cladding is in contact with the second cladding.

6. The power over fiber system according to claim 2, wherein a semiconductor material of a semiconductor region of the semiconductor laser, the semiconductor region exhibiting a light-electricity conversion effect, is a laser medium having a laser wavelength of 500 nm or less.

* * * * *